UNITED STATES PATENT OFFICE.

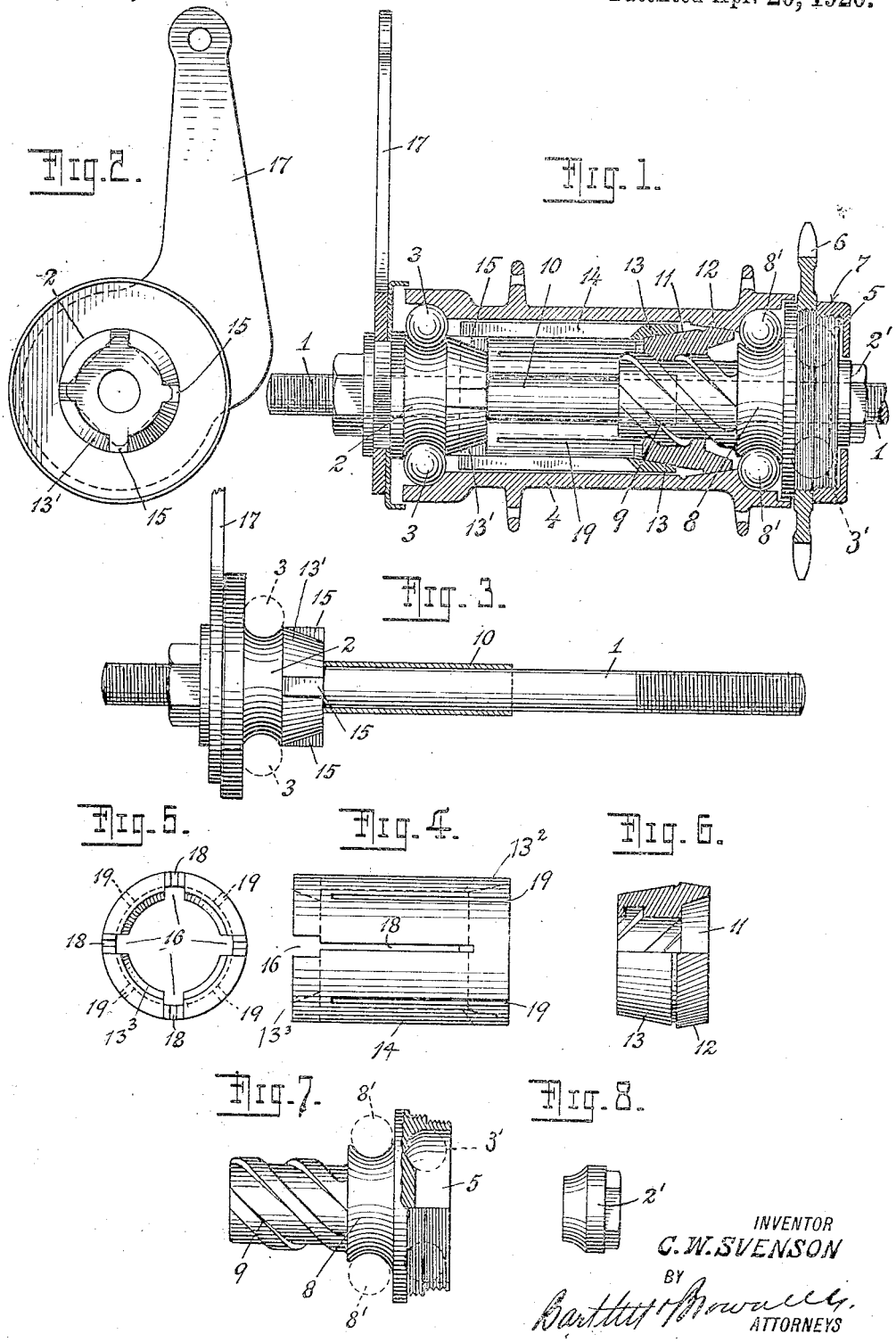

CHARLES WALFRID SVENSON, OF NEW BRITAIN, CONNECTICUT, ASSIGNOR TO AMERICAN HARDWARE CORPORATION, OF NEW BRITAIN, CONNECTICUT, A CORPORATION OF CONNECTICUT.

COASTER-BRAKE.

1,337,624.  Specification of Letters Patent.  Patented Apr. 20, 1920.

Application filed January 9, 1919. Serial No. 270,309.

*To all whom it may concern:*

Be it known that I, CHARLES W. SVENSON, a citizen of the United States, residing at New Britain, county of Hartford, State of Connecticut, have invented certain new and useful Improvements in Coaster-Brakes, of which the following is a full, clear, and exact description.

My invention relates to improvements in coaster brakes and has for its object to provide a coaster brake which shall be simple in construction and efficient in operation. It further has for its object to provide a coaster brake having a tubular brake shoe always held from revolving and to provide means engaging the interior of said shoe for expanding the same by radial action so as to produce the desired braking effect.

The following is a description of an embodiment of my invention, reference being had to the accompanying drawings, in which, Figure 1 shows a longitudinal section of a brake embodying my invention;

Fig. 2 shows in end elevation the stationary anchorage and left-hand cone of Fig. 1, together with the securing lever:

Fig. 3 shows the axle with the brake shoe anchor and holding lever mounted thereon; and, Figs. 4, 5, 6, 7 and 8 show details of the other elements of the device.

Referring more particularly to the drawings, 1 is the axle carrying cones 2—2' for the balls 3—3'. The balls 3 support one end of a hub shell 4 and the balls 3' support a sleeve 5 on which is fixedly mounted a sprocket wheel 6 which is held in place by the screw-threaded lock nut cover 7. The sleeve 5 has a secondary cone 8 supporting balls 8' by which is supported the other end of the hub shell 4. The secondary cone 8 has formed integral therewith a screw-threaded projection 9 surrounding the axle and also surrounding the end of a sleeve 10 which extends from the opposite cone 2 into said projection 9 and acts as a guide for said projection 9. Upon this screw-threaded projection 9 is a nut 11 having internal screw-threads engaging the screw-threads on the projection 9 and having on its surface adjacent to its right hand end a tapered gripping surface 12 adapted to engage and disengage a corresponding tapered internal gripping surface upon the hub shell and tending to center the shell upon the sleeve when the gripping surfaces are in engagement. The left-hand or inner end of this nut is tapered gently inward toward said inner end at 13 and is surrounded by one end of a tubular brake shoe 14 having a corresponding internal taper $13^2$. The cone 2 has a portion provided with a tapering surface 13', which tapered surface is more abrupt than the taper 13 and is provided with four longitudinally extending projections 15. The brake shoe surrounds this tapered portion 13' also and its corresponding end is internally tapered, as shown at $13^3$. That end is provided with four slots 16 which embrace the projections 15. The projections 15 are always stationary and are always within the slots 16, and the brake shoe is thereby always held against rotary movement. The member carrying the projection 15 is held by the lever 17 fixed to the frame of the vehicle and constitutes a stationary anchorage for the tubular brake shoe 14. Registering with four slots 16 are four longitudinally extending slits 18 in the brake shoe, which extend well toward the right-hand end of the brake shoe. Between these slits are four other slits 19 in the brake shoe, which extend from the right-hand end to well toward the left-hand end of the shoe. The slits 18 and 19 render the brake shoe expandible at each end.

The operation of my coaster brake is as follows:

The left-hand cone 2 is held from rotation by the lever 17, which is secured to some portion of the vehicle frame. When power is applied to the sprocket 6 to turn it in a clockwise direction (looking toward end carrying the cap 7) the nut 11 is moved toward the right so that its gripping surface 12 engages the corresponding gripping surface upon the hub shell, thereby causing the shell to revolve in a forward direction. The nut 11 thus locks the sleeve 5 to the shell 4 and also centers the one within the other. When power ceases to be applied to the sprocket 9 so that it stops, the shell of the hub continues to revolve as the vehicle moves on and a slight turning of the nut 11 upon the threaded member 9 causes it to be withdrawn, so that its gripping surface 12 leaves the gripping surface of the shell, permitting the wheel to run freely. When power is applied to the sprocket 6 to move it in the reverse direction, the nut 11 is further moved toward the left and its tapered portion 13 forced within the adjacent end of the brake shoe so as to expand the same and cause it to engage the inner surface of the hub shell. At the same time the other internally tapered end of the brake shoe is forced upon the tapered portion 13', expanding that end also so that the brake shoe is forced into frictional engagement with the interior surface of the shell at both ends. The brake shoe being held at all times from rotating by its engagement with the projections 15, exerts a braking effect upon the shell when thus forced into engagement with the shell. The braking action is thus independent of any endwise clutching action.

The left-hand tapers 13' 13³ are much more abrupt than the right-hand tapers 13 13² so that on being released the brake shoe tends to move to the right more than it tends to move to the left and thus to be held in engagement with the tapered surface 13 upon the nut 11. The co-acting tapered surface 13 and the brake shoe are so proportioned that whenever the gripping surface at 12 disengages the corresponding surface on the shell, there is a slight engagement between the tapered surfaces at 13 which results in having the nut 11 always under control on account of its either gripping with the shell or being in frictional engagement with the brake shoe. The frictional engagement with the brake shoe acts as a slight drag on the nut 11 to retard its movement whenever the gripping surfaces are not in engagement, thus insuring a relative movement between the nut 11 and the sleeve 5 whenever the sleeve is rotated relatively to the brake shoe and thus insuring in a simple manner the proper action of the brake. When the sprocket is again driven clockwise the brake shoe is released and the nut locked to the shell so as to drive the same.

As will be evident to those skilled in the art, my invention permits of various modifications without departing from the spirit thereof or the scope of the appended claims.

What I claim is:

1. In a braking mechanism, the combination of an axle, a hub shell surrounding said axle, an expandible tubular brake shoe in said shell, a stationary anchorage for one end of said shoe preventing rotation thereof at all times, a nut having a tapered inner end revoluble relatively to said brake shoe, said tapered inner end being within the other end of said shoe and acting directly thereon to expand the same when forced therein, and the outer end of said nut and shell having corresponding gripping surfaces, a screw-threaded sleeve within said nut, said shell being revolubly mounted on said anchorage and sleeve and said sleeve being rotatably mounted on said axle and being provided with driving means.

2. In a braking mechanism, the combination of an axle, a hub shell surrounding said axle, a tubular brake shoe in said shell expandible at both ends, a stationary anchorage for one end of said shoe preventing rotation thereof at all times, a nut having its inner end tapered and within the other end of said shoe and revoluble relatively thereto and acting directly thereon to expand the same when forced therein, and the outer end of said nut and shell having corresponding gripping surfaces, a screw-threaded sleeve within said nut, said shell being revolubly mounted on said anchorage and sleeve and said sleeve being rotatably mounted on said axle and being provided with driving means, said anchorage having a tapered portion entering the bore of the end of said tubular brake shoe adjacent thereto.

3. In a braking mechanism, the combination of an axle, a hub shell surrounding said axle, a tubular brake shoe in said shell expandible at both ends, a stationary anchorage for one end of said shoe preventing rotation thereof at all times, a nut having its inner end tapered and within the other end of said shoe and revoluble relatively thereto and acting directly thereon to expand the same when forced therein, and the outer end of said nut and shell having corresponding gripping surfaces, a screw-threaded sleeve within said nut, said shell being revolubly mounted on said anchorage and sleeve and said sleeve being rotatable on said axle and being provided with driving means, said stationary anchorage having a tapered portion entering the end of said shoe adjacent thereto, the taper on said anchorage being more abrupt than the taper on said nut.

4. In a braking mechanism, the combination of an axle, a hub shell surrounding said axle, an expandible tubular brake shoe in said shell, said brake shoe having integrally connected spring tongues extending lengthwise thereof, a stationary anchorage for one end of said shoe preventing rotation thereof at all times, a tapered nut having its inner end within the other end of said shoe and revoluble relatively thereto and acting to expand the same when forced therein, and the outer end of said nut and shell having corresponding gripping surfaces, a screw-threaded sleeve within said nut, said shell being revoluble on said anchorage and sleeve and said sleeve being rotatable on said axle and being provided with driving means, said spring tongues of said shoe directly engaging and exerting a frictional drag on said nut whenever said gripping surfaces are out of engagement and said sleeve is turned relatively to said shoe.

5. In a coaster brake, the combination of an axle, a hub shell surrounding said axle, an expandible tubular brake shoe in said shell, having lengthwise extending integrally connected spring tongues, a stationary anchorage for one end of said shoe preventing rotation thereof at all times, a tapered nut having its inner end within the other end of said shoe and revoluble relatively thereto and acting directly thereon to expand the same when forced therein, and the outer end of said nut and shell having corresponding gripping surfaces, a screw-threaded sleeve within said nut, said shell being revolubly supported on said anchorage and sleeve and said sleeve being rotatable on said axle and being provided with driving means, said gripping surfaces being tapered in the opposite direction from the taper on the portion of the nut lying within said shoe.

6. In a braking mechanism, a tubular brake shoe, composed of a single piece of spring metal and the bore of which at each end tapers toward the other end, the taper of the bore being more abrupt at one end than at the other end.

7. In a braking mechanism, the combination of an axle, a hub shell surrounding said axle, a tubular brake shoe in said shell having longitudinally extending yielding tongues at both ends so as to be expandible at both ends and having at both ends internal tapered surfaces, those at one end being more abrupt than those at the other, a stationary anchorage engaging the end having the more abrupt internal taper and preventing said shoe from turning at all times and having a portion within and engaging said abrupt tapered surfaces, an internally threaded nut having a portion engaging the less abrupt internal tapered surfaces and revoluble relatively to said shoe, said anchorage and nut acting to expand said shoe when forced into the same, the outer end of said nut and said shell having co-acting gripping surfaces, a screw-threaded sleeve within said nut engaging the screw-threads thereof, and means for rotating said sleeve, said shell being rotatably mounted on said anchorage and sleeve, the tongues of said shoe making direct yielding engagement with said nut so as to act as a drag thereon to cause relative movement between it and said sleeve when said sleeve is moved relatively to said shoe and said gripping surfaces are out of engagement.

CHARLES WALFRID SVENSON.